United States Patent Office 2,797,978
Patented July 2, 1957

2,797,978

ALUMINUM AND MAGNESIUM HYDROXY CARBONATE

Stewart M. Beekman, Chatham, N. J., assignor to Reheis Company, Inc., a corporation of New York No Drawing. Application January 4, 1956, Serial No. 557,257

5 Claims. (Cl. 23—50)

This invention relates to aluminum magnesium hydroxy carbonate and the process of making it.

The product is particularly useful in the manufacture of antacids for oral administration and will therefore be first illustrated by description in connection with such use.

Aluminum hydroxide gel, actually including some carbonate, is a standard therapeutic for the treatment of peptic ulcer and other symptoms of gastric hyperacidity, the gel neutralizing excess gastric acidity to a pH of about 4.0, being mildly astringent and demulcent, and not increasing acid rebound, i. e., acid generation in the stomach, to the extent found with other more strongly alkaline antacids.

The gel, however, undergoes undesirable change on drying during its manufacture and still more change in aging the dried material. This change involves decrease in the rate of reactivity with dilute acid such as N/10 HCl.

Quantitative measurements of the loss of reactivity during drying of freshly precipitated aluminum hydroxide gel have been made. Data of M. Mutch is reproduced in part below. The gel of high ignition loss in the table is that which contains the most water. The several samples of decreased ignition loss show the extent to which M. Mutch has progressively dried his gel before test and also the accompanying decrease in rate of action with dilute acid (Q. J. Pharm. and Pharmacol., 1946).

| Loss on Ignition, Percent | Al Content calc. as $Al_2O_3$, Percent | Reaction Time with N/10 HCl, min. |
|---|---|---|
| 92.8 | 7.2 | 3.5 |
| 47.5 | 52.5 | 15 |
| 42.0 | 58.0 | 30 |

The time in the Mutch test is that required for a given weight of alumina in the antacid material to react with 78.3% of the stoichiometric proportion of N/10 hydrochloric acid at 37° C. to the Toepfer's end point.

It will be observed that the time required for the neutralization lengthened more than 8 times as the drying progressed to the stage at which the specimen showed loss on ignition (mostly water) of 42%.

My results correlating drying and reactivity of aluminum hydroxide gels are in the same order as those of Mutch. Using the Reheis method to be described later herein, I have found the reaction time to Toepfer's end point for aqueous suspensions of undried aluminum hydroxide gel ($Al_2O_3$ content 4.0%) to increase from 10-20 sec. to 3.5–5 min. for the same gel after drying and to 11.5 min. after drying and subsequent storage for 4 years.

I have now discovered a means of largely preserving, in the dried product and stored product, the fast rate of reaction of the freshly precipitated gel, without creating in the gel such a high pH as to be objectionable for stomach use.

Briefly stated, the invention comprises the process of and the product resulting from forming an intimate aqueous blend of hydrous aluminum hydroxy carbonate gel and magnesium carbonate, this term including basic carbonate, and then drying the blended product to solid, apparently dry condition still containing a substantial proportion of water.

In so doing I make an aluminum magnesium hydroxy carbonate gel not only of satisfactory rate of reaction with dilute acid but also of pH, when suspended in moderate excess in dilute acid corresponding to gastric acidity, that is below 4.5 and normally about 4.0, the term "aluminum magnesium hydroxy carbonate gel" being used herein to designate the material resulting from my process, regardless of whether it is a chemical compound or a mixture.

Also I fiind that incomplete drying of the aluminum magnesium hydroxy carbonate complex is helpful in preserving the maximum rate of reaction with acid of the pH corresponding to that of the stomach. Thus I find that the desired rate of reaction is preserved when the drying is stopped at a level of contained water (as determined by the Karl Fischer method) within the range 10%–25% of the weight of the incompletely dried gel, the product appearing to be a dry solid.

As to materials used, I may use aluminum hydroxide gel of kind described in the U. S. Pharmacopoeia. I use to advantage such gel containing a substantial proportion of carbonate so that the gel is in effect an aluminum basic carbonate containing 10%–40% of carbonate, calculated as $CO_2$, on the weight of the aluminum calc. as $Al_2O_3$. The aluminum basic carbonate gel is made in any convenient manner, as illustrated in Example 1.

As the magnesium salt I use ordinarily magnesium chloride. While the sulfate or nitrate may be used there is no advantage in such use and there are disadvantages for some purposes, particularly if the sulfate or nitrate ion is incompletely removed by the final washing step in manufacturing the desired gel.

As to proportions, the desired high rate of activity of the resulting gel is preserved even with a very low proportion of magnesium to aluminum. Thus, I may use magnesium in amount to provide atomic proportions, in my reacting materials, of 1Mg for 1–5Al. Expressed in terms of the finished product the aluminum magnesium hydroxy carbonate may contain about 5%–25% of magnesium calculated as MgO for 100 of total weight of the magnesium and aluminum both calculated as the oxides. A small proportion of magnesium within this range is effective for most purposes. The carbonate ($CO_2$) content of the finished product is suitably 5%–25% on the dry basis.

As to conditions of manufacture, the necessary intimate blend of the aluminum basic carbonate gel and magnesium carbonate is effected while the aluminum gel is in aqueous condition and before the resulting mixture is subjected to drying.

The invention will be further illustrated by detailed description in connection with the following specific examples of the practice of it. In these examples and elsewhere herein the proportions are expressed as parts by weight unless specifically stated to the contrary.

EXAMPLE 1

Aluminum magnesium hydroxy carbonate in which the atomic ratio in the reactants used is Al:Mg=2:1

Formation of precipitate No. 1.—6.24 parts of soda ash $Na_2CO_3$ were dissolved in 107.4 parts of water at room temperature. Aluminum hydroxy carbonate gel was precipitated by adding 25.3 parts of aluminum chloride solution of density 24° Bé. at 20° C., with stirring, to the sodium carbonate solution at such rate that the total time required for the addition was about 36 min. The pH of the reacting mixture at the start was 10.85 and approximately 5.4 after addition of the last of the aluminum chloride solution.

*Formation of precipitate No. 2.*—4 parts of magnesium chloride $MgCl_2 \cdot 6H_2O$ were dissolved in 36 parts of water. The resulting solution was added to precipitate No. 1 contained in the reaction vessel. A 10% sodium carbonate solution, containing 2.1 parts of soda ash in 18.9 parts of water, was added to the reaction vessel over a period of 8 min. The pH changed from 5.4 at the start to about 8.1 at the end of the addition of the sodium carbonate.

The precipitated slurry containing the aluminum hydroxide gel and the magnesium carbonate precipitated in association therewith was aged 1 hour. Then the slurry was filtered through a plate and frame filter press at 48 p. s. i. pressure and the filter cake washed with water until free of soluble salts.

The filter cake was then discharged from the filter press and dried in air at approximately 105° F. to constant weight. The weight of dry solids was approximately 19% of the wet cake.

The dried filter press cake was then ground through a high speed hammer mill using 0.0035" herringbone screen.

The resulting product was a finely divided white soft powder having the following composition and properties:

Aluminum calc. as $Al_2O_3$_____percent__ 44.0
Magnesium calc. as MgO_____do____ 4.31
Carbonates calc. as $CO_2$_____do____ 14.6
Chlorides calc. as Cl_____do____ 0.08
Water (Karl Fischer method)_____do____ 19.6
Acid consuming capacity N/10 HCl per g___ml__ 282
Reaction velocity:
   *a.* Reheis method_____sec__ 22
   *b.* Mutch method_____sec__ 54
Apparent density_____ 0.196
pH of 4% aqueous suspension_____ 9.1
Through 325-mesh, wet screening_____percent__ 75.53

It will be understood that different batches of the product vary somewhat in composition and properties.

The Reheis and the Mutch methods of determining rates of reaction with acids are as follows:

In the Reheis method aluminum compound (in this case the basic carbonate) equivalent to 0.5 g. of $Al_2O_3$ is added to 100 ml. of N/10 HCl at 37.5° C., with 2 drops of Toepfer's reagent as the end point indicator. The whole is shaken and maintained at 37.5° C. until the indicator changes color. The time required for this reaction is noted.

The Mutch test is similar to the Reheis test except that the Mutch test uses an amount of the aluminum compound equivalent to 0.1 g. $Al(OH)_3$ and 30 ml. of N/10 HCl.

EXAMPLE 2

The aluminum and magnesium compounds of Example 1 are precipitated as there described, except that they are precipitated independently, in separate containers. The washed filtered products are thoroughly blended in a Waring blender, then the mixed material is dried as described in Example 1.

*Behavior of aluminum magnesium hydroxy carbonate with artificial gastric juice, compared with aluminum hydroxide before and after drying*

Aluminum hydroxide gel undergoes another undesirable change during the drying process, from the point of view of being an efficient antacid.

The presence of the gastric enzyme, pepsin, greatly reduces its antacid action, as demonstrated by Murphy, Jour. Amer. Pharmaceutical Assoc., Sc. Ed., 41, 361, 1952, using a modification of a technique developed by Holbert, Noble, and Grote (ibid., 37, 292, 1948).

The dried gel of my invention, on the other hand, undergoes no significant diminution in antacid activity even in the presence of pepsin. This is illustrated in the table below which compares the antacid action of (1) aluminum hydroxide gel, U. S. P. XIV; (2) dried aluminum hydroxide gel, U. S. P. XIV; and (3) my dried aluminum magnesium hydroxy carbonate. As can be observed, the data for the aluminum magnesium hydroxy carbonate is very similar to that of the undried aluminum hydroxide gel, in both promptness of reaction and sustained antacid action. The pH for the dried aluminum hydroxide gel falls below 3 during the entire two-hour test, whereas the ideal pH range for an antacid has been stated (Fuchs, Drug and Cosmetic Ind., 64, 692, 1949), to lie between pH 3 and pH 5. My product averages above pH 4 and the pH, once established, remains practically steady.

The results, as read from graphs, follow:

pH OF ARTIFICIAL GASTRIC JUICE MADE WITH WATER HYDROCHLORIC ACID, AND PEPSIN

| Approx. pH of Artificial Gastric Juice Continuously Introduced and Withdrawn | Antacid Gel Used | | |
|---|---|---|---|
| | Aluminum Hydroxide | Dried Aluminum Hydroxide | Dried Al Magnesium Hydroxy Carbonate |
| Start (original juice) | 1.5 | 1.5 | 1.5 |
| Stirred with antacid, minutes: | | | |
| 2 | 4.1 | 1.7 | 4.1 |
| 5 | 4.1 | 1.9 | 4.2 |
| 10 | 4.1 | 2.2 | 4.4 |
| 20 | 4.2 | 2.5 | 4.4 |
| 40 | 4.1 | 2.4 | 4.4 |
| 60 | 4.1 | 2.4 | 4.2 |
| 80 | 4.1 | 2.3 | 4.1 |
| 100 | 4.0 | 2.2 | 4.0 |
| 120 | 4.0 | 2.2 | 3.9 |

The aluminum magnesium hydroxide carbonate gel used contained 14.5 parts of Mg for 100 of Mg+Al, both being calculated as the oxides.

The test procedure which I used is a modification of a method developed by Holbert, Noble, and Grote for the determination of antacid efficacy. The method was designed to simulate the mode of behavior of an antacid in the stomach. In addition to using pH 1.5 hydrochloric acid containing 2 grams pepsin N. F. per liter, as an artificial gastric juice, the method incorporates the feature of removal of part of the acid-antacid mixture at definite intervals, to simulate the loss of material from the stomach through the pylorus into the duodenum. My modification from the original method consists of addition of the artificial gastric juice at a steady rate and allowing the acid-antacid mixture to leave at a steady rate, rather than at spaced intervals.

What I claim is:

1. In making aluminum magnesium hydroxy carbonate gel of high rate of reactivity with dilute acid, the process which comprises mixing hydrous aluminum hydroxy carbonate gel with precipitated magnesium carbonate in aqueous suspension in proportion to provide 5–25 parts of magnesium for 100 of total weight of magnesium and aluminum calculated as the oxides, intimately blending the mixed materials, and then subjecting the blended product to drying to remove water therefrom.

2. In making aluminum magnesium hydroxy carbonate gel of high rate of reactivity with dilute acid, the process which comprises mixing hydrous aluminum hydroxy carbonate gel with precipitated magnesium carbonate in aqueous suspension in proportion to provide 5–25 parts of magnesium for 100 of total weight of magnesium and aluminum calculated as the oxides, intimately blending the mixed materials, and then drying the blended product and discontinuing the drying at a water content within the range 10%–25% of the weight of the thus dried product.

3. In making aluminum magnesium hydroxy carbonate gel of high rate of reactivity with dilute acid, the process which comprises mixing aluminum hydroxy carbonate gel with a solution of magnesium salt in proportion to provide 5–25 parts of magnesium for 100 of total weight of magnesium and aluminum calculated as the oxides, introducing into the resulting mixture a water soluble carbonate precipitating agent for the magnesium in proportion at least approximately equal stoichiometrically to the magnesium salt, water washing the resulting precipitate of magnesium carbonate on and within the particles of aluminum hydroxy carbonate, to remove soluble electrolyte present, and then drying the washed product.

4. The process of claim 3 which includes aging the precipitated aluminum and magnesium basic carbonate for a substantial period of time before the washing is undertaken so as to promote migration of any remaining ions of the said magnesium salt and precipitating agent within the particles of the aluminum hydroxy carbonate gel.

5. In making aluminum magnesium hydroxy carbonate gel of high rate of reactivity with dilute acid, the process which comprises mixing hydrous precipitated aluminum hydroxy carbonate gel with a suspension of finely divided magnesium carbonate in proportion to provide 5–25 parts of magnesium for 100 of total weight of magnesium and aluminum calculated as the oxides, continuing the mixing until the magnesium carbonate is blended with the individual particles of the said gel, and then subjecting the thus blended materials to drying.

References Cited in the file of this patent

J. W. Mellor's "A Comprehensive Treatise on Inorganic and Theoretical Chemistry," volume 5, 1924, page 359, Longmans, Green and Company, New York.